United States Patent [19]

Gauron

[11] Patent Number: 4,490,883
[45] Date of Patent: Jan. 1, 1985

[54] FASTENER FOR RELEASABLY AND ADJUSTABLY CONNECTING TWO STRUCTURAL MEMBERS

[76] Inventor: Richard F. Gauron, 26020 SE. 158th, Issaquah, Wash. 98027

[21] Appl. No.: 415,539

[22] Filed: Sep. 7, 1982

[51] Int. Cl.³ .................... E05D 7/04; E05D 7/12
[52] U.S. Cl. .................................. 16/245; 16/262; 16/270; 16/361; 16/380
[58] Field of Search ................ 16/238, 323, 245, 333, 16/246, 343, 249, 361, 257, 259, 262, 270, 271, 272, 304, 324, 326, 335, 336, 348, 349, 357, 362, 364, 365, 380, 382, 386, DIG. 43

[56] References Cited

U.S. PATENT DOCUMENTS

| | | | |
|---|---|---|---|
| 433,979 | 8/1890 | Crofford . | |
| 444,299 | 1/1891 | Mills . | |
| 617,211 | 1/1899 | Willer . | |
| 1,944,475 | 1/1934 | Stowell | 24/236 |
| 2,448,580 | 9/1948 | Crosby | 248/37 |
| 2,480,051 | 8/1949 | Schmitt | 16/172 |
| 2,497,337 | 2/1950 | Ackerman | 16/259 |
| 3,061,870 | 11/1962 | Giannini, Sr. | 16/177 |
| 3,178,761 | 4/1965 | Restaino | 16/257 |
| 3,584,332 | 2/1967 | Taylor | 16/245 |

FOREIGN PATENT DOCUMENTS 2657628 6/1978 Fed. Rep. of Germany ........ 16/245

Primary Examiner—Fred A. Silverberg
Attorney, Agent, or Firm—Joan H. Pauly; Delbert J. Barnard

[57] ABSTRACT

First (12) and second (42,62) body portions are each attached to a structural member. The first body portion (12) includes trunnions (18) that are slidably received in corresponding channels in the second body portion (42,62). The second body portion (42,62) includes a base member (62) and a pivot member (42), which cooperate to form the channels. The pivot member (42) has an open position and a closed position. A spring (82) biases the pivot member (42) in its closed position. A lever (44) moves the pivot member (42) against the force of the spring (82) into its open position. When the pivot member (42) is in its closed position, it blocks portions of the channels, thereby locking the trunnions (18) into one of two lock positions in the channels. When the pivot member (42) is in its open position, the trunnions (18) may slide in the channels from one lock position to another or out of the channels to disengage the two body portions. The trunnions (18) are mounted on the first body portion (12) on a screw (20) and may move longitudinally along this screw (20) and with respect to the rest of the first body portion (12). This movement permits the two body portions, and therefore the two structural members, to be moved translationally with respect to each other without releasing the connection between them.

31 Claims, 13 Drawing Figures

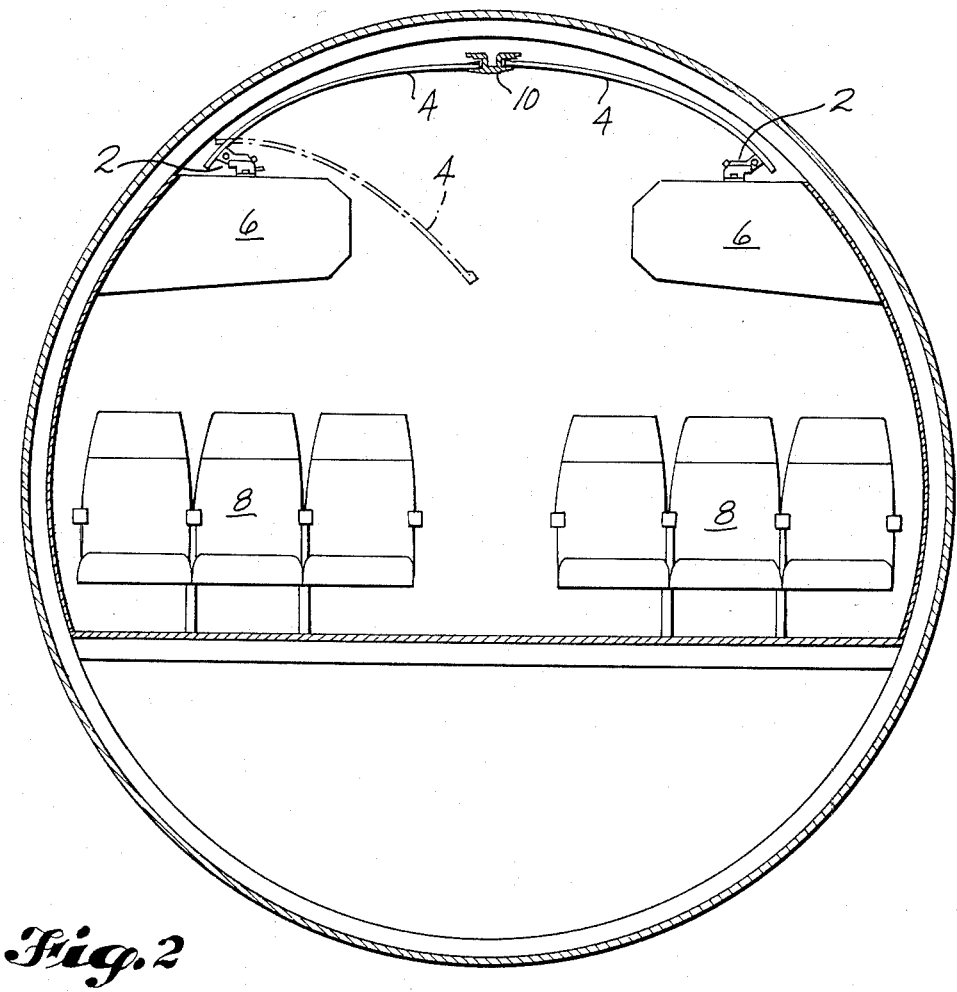
Fig. 2
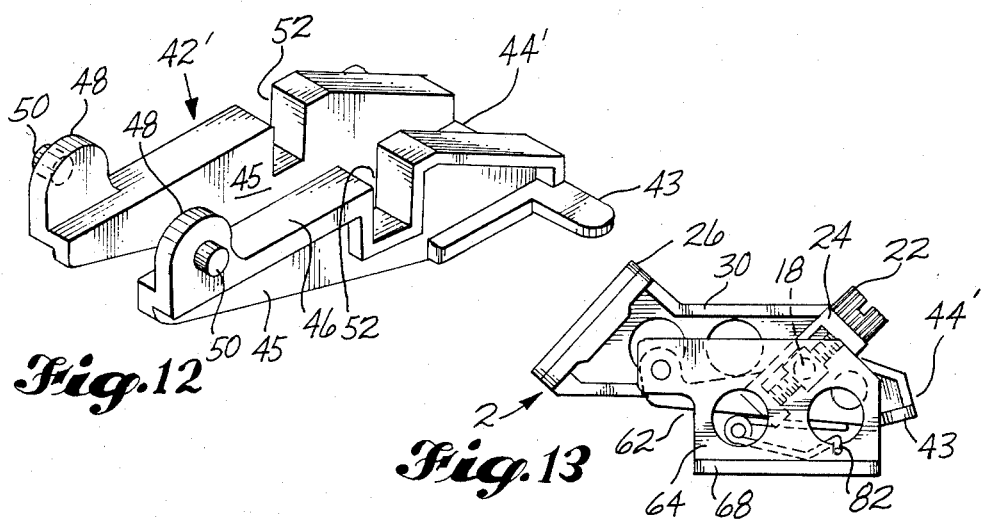
Fig. 12
Fig. 13

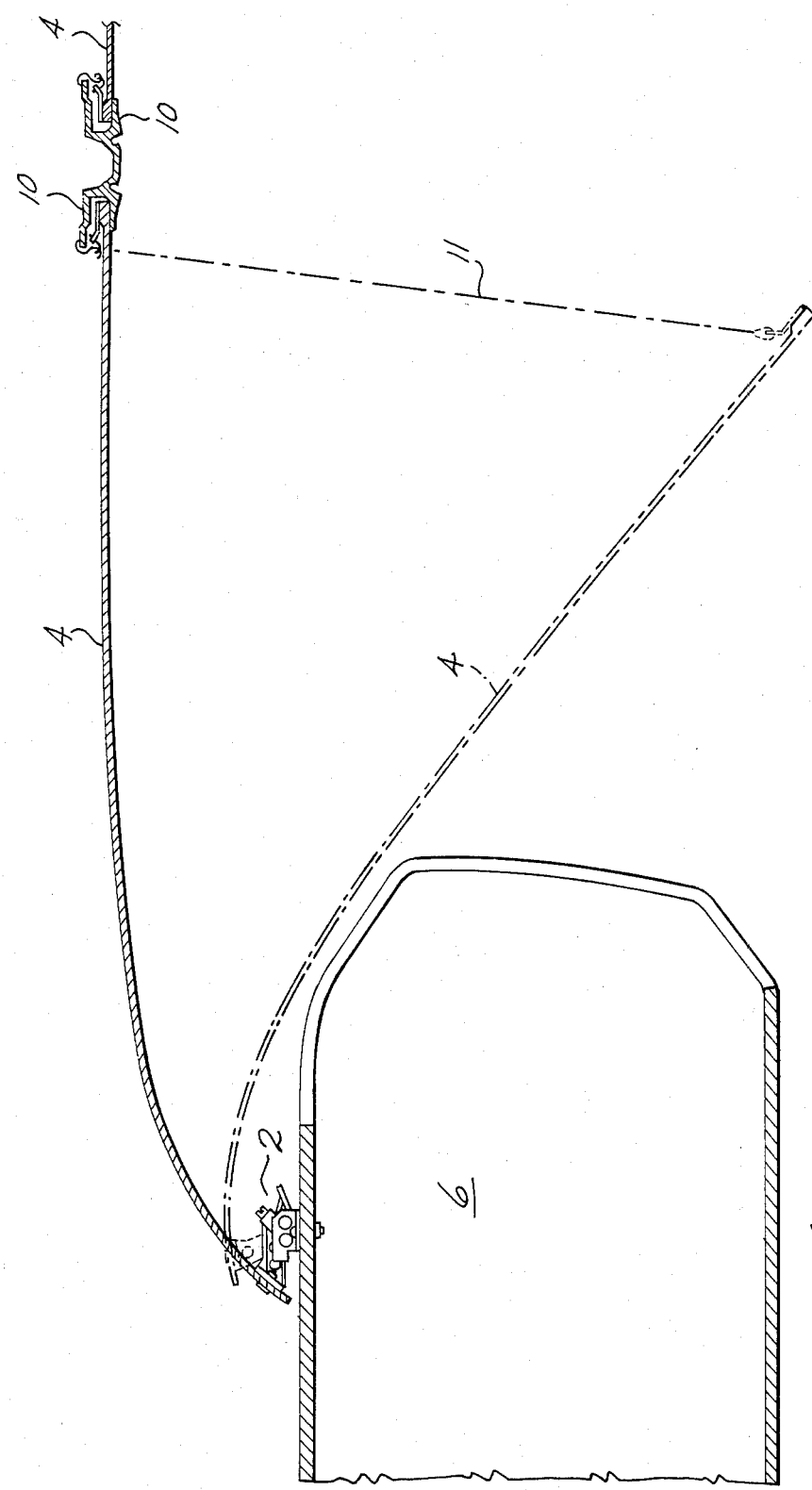

FASTENER FOR RELEASABLY AND ADJUSTABLY CONNECTING TWO STRUCTURAL MEMBERS

TECHNICAL FIELD

This invention relates to fasteners and, more particularly, to a fastener for releasably and adjustably connecting two structural members and for allowing one of the structural members to rotate and move translationally with respect to the other structural member while remaining connected to the other structural member.

BACKGROUND ART

A primary object of this invention is to provide an improved fastener for connecting the outer end of a ceiling panel in an aircraft to a storage bin located below the outer portion of the ceiling panel. The fasteners that are currently being used for this purpose have a number of problems associated with their use. One of the primary problems is the absence of sufficient capability for adjusting the positioning of the ceiling panel so that it is properly aligned. Each ceiling panel extends from the side of the aircraft to approximately the center of the aircraft. The inner edge of the panel is received into a C-shaped support located at the center of the aircraft. Inevitably there are variations in the width of the panels and in the width of the aircraft. These variations require adjustments in the positioning of the ceiling panel so that it properly fits into the C-shaped support. As noted above, conventional fasteners for the ceiling panels do not provide adequate adjustment capability.

There are a number of other problems associated with the use of conventional fasteners. The fasteners now commonly used have loose parts that make installation and adjustment more difficult and that can become lost. In addition, the ceiling panel generally must be completely removed in order to provide maintenance above the panel, such as changing a light. Both the loose parts and the need to remove the panel make even routine maintenance of the aircraft more complicated and expensive. Conventional fasteners also tend to be relatively heavy and expensive. This adds to the purchase cost of the parts for the aircraft and also adds to the cost of running the aircraft. In these days of high fuel prices, even a small weight difference in a part like a fastener quickly adds up and can significantly increase the amount, and therefore the cost, of the fuel necessary to run the aircraft. In this context, it should be noted that each aircraft contains a large number of fasteners.

The following is a list of United States patents that disclose a hinge-like fastener that includes a pin or pin-like structure that is removably retained in a suitable opening.

U.S. Pat. No. 433,979, granted Aug. 12, 1890, to Warren K. Crofford; U.S. Pat. No. 444,299, granted Jan. 6, 1981, to L. C. Mills; U.S. Pat. No. 617,211, granted Jan. 3, 1899, to Henry E. Willer; U.S. Pat. No. 1,944,475, granted Jan. 23, 1934, to G. W. Stowell; U.S. Pat. No. 2,448,580, granted Sept. 7, 1948, to W. J. Crosby; U.S. Pat. No. 2,480,051, granted Aug. 23, 1949, to J. H. Schmitt; U.S. Pat. No. 2,497,337, granted Feb. 14, 1950, to D. S. Ackerman; and U.S. Pat. No. 3,061,870, granted Nov. 6, 1962, to J. M. Giannini, Sr.

Each of the above-listed patents discloses a device that connects two members together. Although most of the devices disclosed allow some pivoting action of the members with respect to each other, none of the patents listed discloses any means for adjusting the translational positions of the connected members with respect to each other.

In each of the devices disclosed in the above-listed patents, the pin-like member is held in its corresponding opening to connect the two members. All of the devices, except those disclosed by Giannini and Willer, include a spring that holds the pin-like member in its opening. Giannini and Willer disclose devices in which a portion of the device pivots to hold the pin in position.

The above patents and the prior art that is discussed and/or cited therein should be studied for the purpose of putting the present invention into proper perspective relative to the prior art.

DISCLOSURE OF THE INVENTION

A subject of this invention is a fastener for releasably and adjustably connecting two structural members. According to a basic aspect of the invention, the fastener comprises a first body portion including journal means and a second body portion including channel means for slidably receiving the journal means. Disengageable lock means is provided for locking the journal means in the channel means in any one of at least two lock positions to prevent the journal means from sliding in the channel means and to lock the first and second body portions together. Also provided is release means for disengaging the lock means to permit the journal means to slide from one lock position to another and the first and second body portions to move translationally with respect to each other and to permit said body portions to be disconnected from each other. The fastener also includes adjusting means for adjusting the translational positions of the body portions with respect to each other while the journal means remains in one of the lock positions. Also included are means for attaching the first body portion to one of the structural members and means for attaching the second body portion to the other of the structural members. The release means, when it is used to permit movement between lock positions, and the adjusting means serve to allow the two structural members to be moved translationally with respect to each other without releasing the connection between them.

The capability of moving the two structural members translationally with respect to each other while maintaining the connection between them results in a fastener that solves many of the problems associated with conventional fasteners. For example, fasteners constructed according to the invention, unlike conventional fasteners, have the adjustment capability to ensure that each ceiling panel in an aircraft is properly positioned in its center support. In addition, the provision of more than one lock position allows a ceiling panel to be slid outwardly and rotated downwardly to gain access to the space above without completely removing the panel or disconnecting the fastener.

Preferably, the adjusting means includes moving means for moving the journal means with respect to a portion of the first body portion. Also preferably, the moving means comprises a nut member and a screw member. The journal means is rigidly attached to the nut member. The screw member is rotatable in an essentially fixed position, and the nut member moves longitudinally along the screw member when the screw member is rotated.

According to another aspect of the invention, the first body portion is attachable to a substantially planar surface. The moving means moves the journal means in a direction that is substantially parallel to this planar surface.

According to a preferred aspect of the invention, the journal means comprises two coaxial trunnions. The channel means is defined by portions of the second body portion that cooperate to define two channels. Each of these channels slidably receives one of the trunnions.

According to another preferred aspect of the invention, the second body portion comprises a base member and a pivot member. The pivot member has at least two positions including an open and a closed position. In the open position, portions of the base member and portions of the pivot member cooperate to define the channel means for slidably receiving the journal means. In the closed position, the pivot member blocks portions of the channel means to prevent the journal means from sliding in the channel means. Preferably, the lock means comprises biasing means for urging the pivot member into its closed position. Also preferably, the release means comprises a lever formed as an integral extension of the pivot member. The lever, when depressed, moves the pivot member against the force of the biasing means toward its open position.

According to still another preferred aspect of the invention, the first end of the channel means is blocked by the pivot member, whatever the position of the pivot member, to prevent the journal means from sliding out of the first end. The second end of the channel means is blocked by the pivot member when the pivot member is in its closed position, and open when the pivot member is in its open position to allow the journal means to slide out of the channel means to disengage the body portions from each other. This feature has the advantage of preventing the unintended disengagement of the fastener when the journal means is moved toward the first end of the channel means.

According to another basic aspect of the invention, the fastener comprises a first body portion that includes journal means and first mounting means for attaching the first body portion to one of the structural members. The journal means is carried at one end of the first body portion. The first mounting means is carried at the other end of the first body portion. The fastener also includes a second body portion comprising a base member and a pivot member. The base member includes second mounting means for attaching the second body portion to the other of the structural members. The base member has sidewall means extending outwardly from the second mounting means, and flange means extending essentially perpendicularly from an outer portion of the sidewall means. The pivot member includes channel wall means. The pivot member has an open position in which the channel wall means cooperates with the flange means to define channel means for slidably receiving the journal means. The pivot member also has a closed position in which it blocks portions of the channel means to prevent the journal means from sliding in the channel means and to lock the first and second body portions together. Biasing means are provided for urging the pivot member into its closed position. Also provided is positioning means for allowing the two structural members to be moved translationally with respect to each other without releasing the connection between them.

The positioning means preferably comprises adjusting means for adjusting the translational positions of the body portions with respect to each other while the pivot member remains in its closed position to prevent the journal means from sliding in the channel means.

According to a preferred aspect of the invention, the journal means has at least two lock positions in the channel means and is prevented from sliding out of any one of these lock positions by the pivot member when the pivot member is in its closed position. The positioning means comprises release means for moving the pivot member against the force of the biasing means toward its open position. This permits the journal means to slide from one lock position to another and the first and second body portions to move translationally with respect to each other.

According to another preferred aspect of the invention, the journal means comprises two coaxial trunnions. The channel means comprises two channels. Each of these channels slidably receives one of the trunnions. The pivot member blocks portions of each of the channels when it is in its closed position. Preferably, the sidewall means of the base member of the second body portion comprises two essentially parallel sidewalls, and the pivot member is positioned between these two sidewalls. Also preferably, the fastener further comprises a lever formed as an integral extension of the pivot member. This lever extends outwardly from between the two sidewalls of the base member. When the lever is depressed, it moves the pivot member against the force of the biasing means toward its open position.

Another subject of the present invention is a fastener in a system in which a first structural member is supported generally above a second structural member. The fastener releasably and adjustably connects an end portion of the first structural member to the second structural member and allows the first structural member to rotate and translate in a substantially horizontal direction with respect to the second structural member while remaining connected to the second structural member. According to a basic aspect of the invention, the fastener comprises a first body portion including journal means and a second body portion including channel means for slidably receiving the journal means. Disengageable lock means is provided for locking the journal means in the channel means in any one of at least two lock positions to prevent the journal means from sliding in the channel means and to lock the first and second body portions together. Release means disengages the lock means to permit the journal means to slide from one lock position to another and the first and second body portions to move translationally with respect to each other and to permit the first and second body portions to be disconnected from each other. The fastener also includes means for attaching the first body portion to one of the structural members, and means for attaching the second body portion to the other of the structural members.

According to a preferred aspect of the invention, the fastener further comprises adjusting means for adjusting the translational positions of the body portions with respect to each other while the journal means remains in one of the lock positions.

Fasteners constructed according to the invention offer advantages over conventional fasteners in addition to those noted above. In fasteners constructed according to the invention, there is no need for any loose parts which might become lost. In addition, the fasteners of the present invention may be constructed relatively inexpensively and may also be constructed from a lightweight material. These advantages help to reduce maintenance costs as well as initial purchase costs. The reduction in maintenance costs is particularly significant when the fastener is constructed of a lightweight material for use in an aircraft. The savings in weight quickly translates into savings in fuel costs.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 2 is a simplified cross-sectional view of the interior of an aircraft in which the preferred embodiment of the fastener is in use, showing in broken lines a ceiling panel in a lowered position to provide access to the space above the panel.

FIG. 3 is an enlarged view of a portion of FIG. 2, showing in solid lines a fastener and a ceiling panel in a fully installed position and in broken lines the fastener and the ceiling panel moved into a position which provides access to the space above the panel.

FIG. 12 is a pictorial view of an alternative preferred embodiment of the pivot member.

FIG. 13 is an elevational view of the preferred embodiment of the fastener shown in FIG. 1, with the pivot member replaced by that shown in FIG. 12.

BEST MODE FOR CARRYING OUT THE INVENTION

Figure 1:
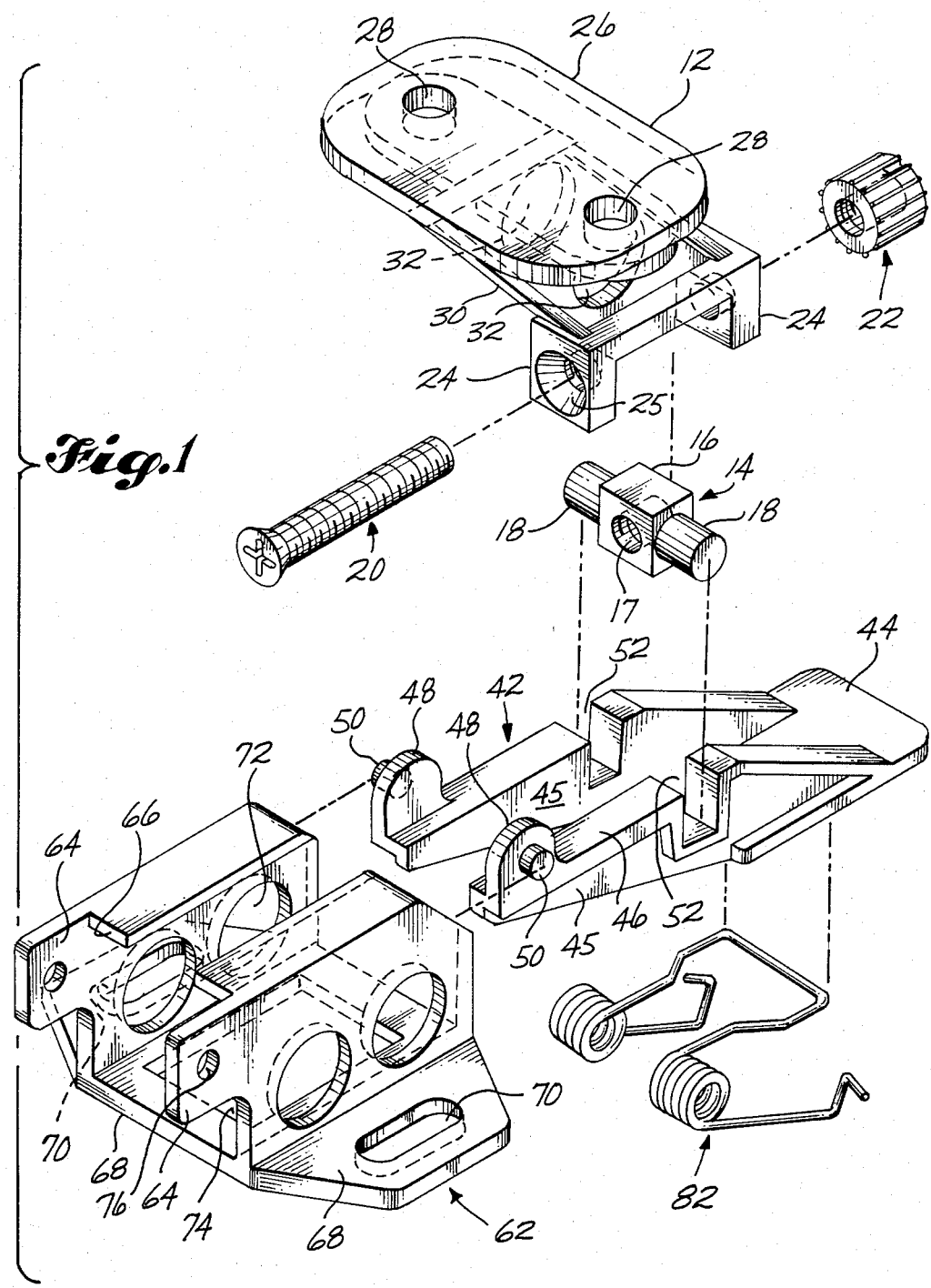
FIG. 1 is an exploded pictorial view of the preferred embodiment of the invention.

The drawings show a fastener 2 that is constructed according to the invention and that also constitutes the best mode of the invention currently known to the applicant. FIG. 2 illustrates the anticipated primary use for the fastener of the present invention. FIG. 2 shows two fasteners 2 installed in an aircraft to support the outer ends of two ceiling panels 4 and connect them to the tops of two storage bins 6. The storage bins 6 are of the type commonly found in passenger compartments of aircraft located above the passenger seats 8.

As shown in the drawings, the preferred embodiment of the fastener 2 has two major body portions, each of which includes a mounting plate 26, 68 for attaching the body portion to a structural member. The first body portion 12 includes journal means 14. The second body portion 42, 62 includes channel means for slidably receiving the journal means. The two body portions are connected together by locking the journal means in the channel means, thereby connecting the two structural members to which the two body portions are attached.

The first body portion 12 comprises the journal means 14, a mounting plate 26, and a connecting bar 30. The journal means 14 preferably takes the form of two coaxial trunnions 18 carried at one end of the first body portion 12 opposite the mounting plate 26. In the preferred embodiment, the mounting plate 26 is positioned at the other end of the first body portion 12 parallel to the axis of the trunnions 18. The mounting plate 26 has two holes 28 extending therethrough for attaching the mounting plate 26 to one of the structural members (in FIG. 2, a ceiling panel 4). The preferred method of mounting the first body portion 12 to the ceiling panel 4 is to place a screw through each of the holes 28 and a corresponding hole in the ceiling panel 4 and to secure the first body portion 12 in place by means of a conventional nut and washer. This mounting arrangement is most clearly shown in FIGS. 4–6, 10, and 11.

The connecting bar 30 extends from the mounting plate 26 to the end of the first body portion 12 at which the coaxial trunnions 18 are carried. The bar 30 has holes 32 extending therethrough in order to reduce the weight of the fastener 2. In the preferred embodiment, the bar 30 extends inwardly from the mounting plate 26 at an angle of 45 degrees to the plate 26. The bar 30 has an outer end that is attached to the mounting plate 26 and an inner end that is parallel to its outer end and perpendicular to the axis of the trunnions 18. The bar 30 in the preferred embodiment is oriented at an angle to the mounting plate 26 in order to accommodate the shape of a typical ceiling panel 4 in an aircraft. Such a ceiling panel 4 curves downwardly at its outer edge to follow the curve of the body of the aircraft. The angular attachment between the mounting plate 26 and the connecting bar 30 permits the fastener 2 to support the ceiling panel 4 generally above the storage bin 6 with the connecting bar 30 in essentially a horizontal position.

Figure 4:
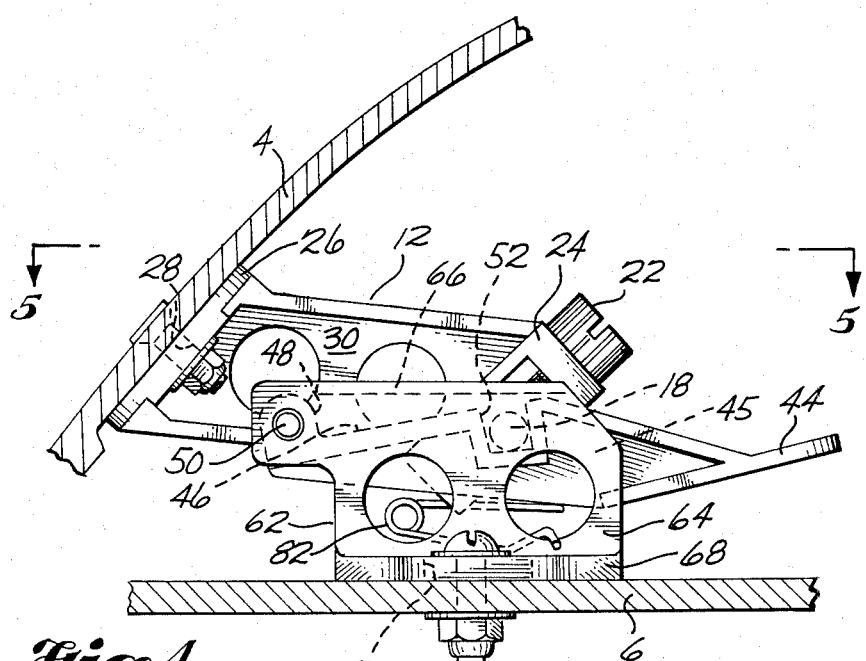
FIG. 4 is a partially sectioned plan view of the preferred embodiment of the fastener, including portions of the top of a storage bin and the outer edge of a ceiling panel to which the fastener is attached and showing the trunnions in the first lock position.
Figure 5:
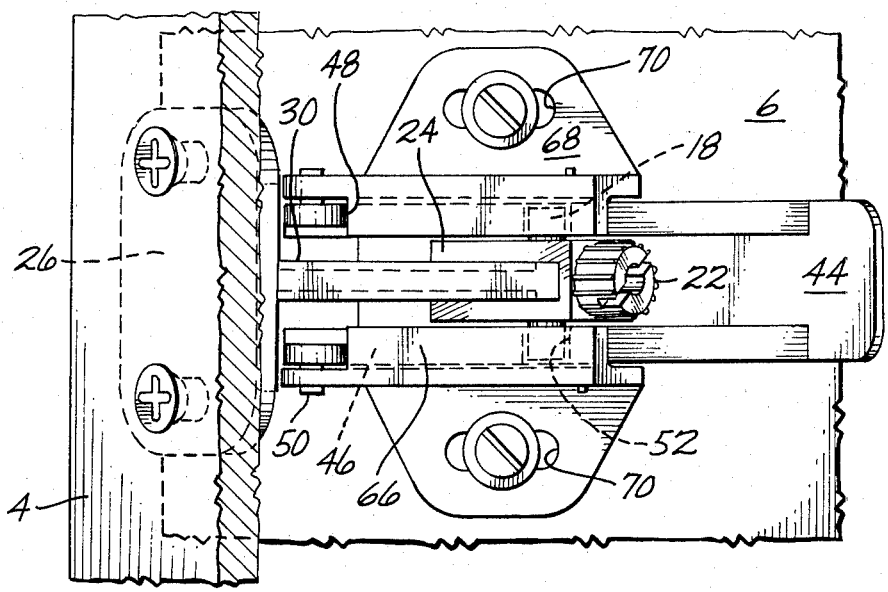
FIG. 5 is a top plan view of the fastener and structural member portions shown in FIG. 4.
Figure 6:
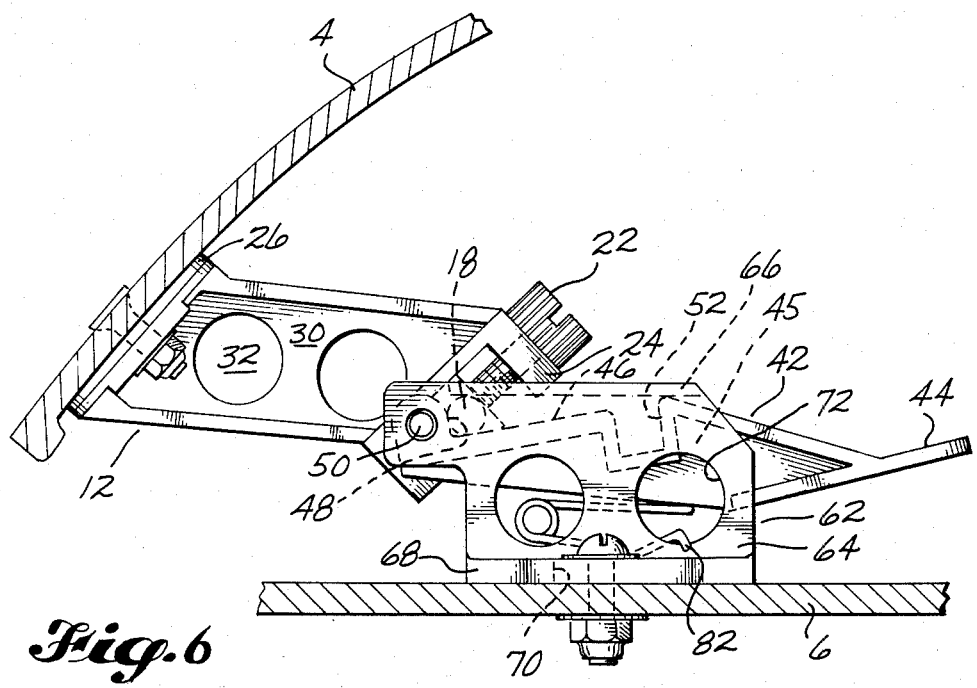
FIG. 6 is similar to FIG. 4 except that it shows the trunnions in the second lock position.

The second body portion of the fastener 2 includes a base member 62 and a pivot member 42. The base member 62 and the pivot member 42 cooperate to form the channel means for receiving the journal means 14 and to lock the journal means 14 in the channel means. The pivot member has a first open position in which the journal means 14 is free to slide in the channel means. It also has a second closed position in which the journal means 14 may be locked into the channel means in either of two lock positions. FIGS. 4 and 6 illustrate the two lock positions, respectively. Of course, a different number of lock positions could be provided without departing from the spirit and scope of the invention.

The base member 62 includes a mounting plate 68, sidewalls 64, and flanges 66. Like the mounting plate 26 in the first body portion 12, the mounting plate 68 has two openings 70 extending therethrough for attaching the mounting plate 68 to a structural member. Conventional screws may be placed into the openings 70 and corresponding holes in the top of the storage bin 6 and secured with nuts and washers in the same manner as the mounting plate 26 is secured. In the preferred embodiment, the openings 70 take the form of slots that are the width of a conventional screw but are in the order of three times as long as the width of a conventional screw. These slots 70 provide an auxiliary means for adjusting the translational positions of the structural members with respect to each other. In order to make the adjustment, the screw need only be loosened, the positioning of the base member 62 adjusted, and the screw retightened. Other means of adjusting the translational positions of the structural members will be discussed below.

The base member 6 preferably has two spaced parallel sidewalls 64 extending perpendicularly and inwardly from the mounting plate 68. A flange 66 extends perpendicularly from the top of each sidewall 64 parallel to the mounting plate 68 and inwardly toward the other sidewall 64. Preferably, the sidewalls 64 and the mounting plate 68 have holes 72, 74 extending therethrough to reduce the weight of the fastener 2.

The pivot member 2 of the second body portion is substantially positioned between the two sidewalls 64 of the base member 62. The pivot member 42 has two spaced parallel sidewalls 45 positioned between and essentially parallel to the sidewalls 64 of the base member 62. A top wall 46 extends perpendicularly from the top of each pivot member sidewall 45 outwardly away from the other pivot member sidewall 45. Each top wall 46 forms a channel wall 46, with the top surface of the channel wall 46 defining a portion of a channel which receives one of the trunnions 18. There are two such channels, each one receiving one of the trunnions 18.

As noted above, the pivot member 42 has an open position and a closed position. Means must be provided for moving the pivot member 42 from its closed position to its open position. The preferred means for so moving the pivot member 42 is a lever 44 formed as an integral extension of the pivot member 42. In the preferred embodiment shown in FIGS. 1-11, the lever 44 extends outwardly from between the base member sidewalls 64 in a direction generally parallel to the base member sidewalls 64. The lever 44 is an integral extension of the pivot member sidewalls 45 and top channel walls 46, with a bottom wall extending between these extensions of the pivot member walls to provide a surface to which pressure may be applied to move the pivot member 42.

A modified preferred embodiment of the pivot member 42' is shown in FIGS. 12 and 13. It is the same as the pivot member 42 shown in FIGS. 1-11 except that the lever 44' extending from it is shortened and has integral side bars 43. The modified lever 44' is an integral extension of pivot member 42', but the integral extensions of the pivot member sidewalls 45 and top channel walls 46 and the bottom wall extending between the extensions are shorter than those in the lever 44. Pressure surfaces are provided by two opposed bars 43, each of which extends laterally outwardly from the outer end of the lever's bottom wall. This configuration provides easier access to the lever 44' from the side.

The pivot member 42, 42' pivots about an axis that extends transversely through the ends of the pivot member sidewalls 45 opposite the lever 44, 44'. This pivot end of each pivot member sidewall 45 has a peg or trunnion 50 extending outwardly therefrom toward the corresponding sidewall 64 of the base member 62. Each sidewall 64 of the base member 62 has a hole 76 for receiving the corresponding peg 50. The pegs 50 are journaled in the holes 76 for pivoting the pivot member 42, 42' about the axis extending through each hole 76 and each peg 50.

The pivot member 42, 42' and the base member 62 cooperate to allow the trunnions 18 to slide into the channels and to lock the first and second body portions together. When the pivot member 42, 42' is in its open position, each channel wall 46, a portion of each base member sidewall 64, and the flange 66 extending therefrom cooperate to define a channel for slidably receiving one of the trunnions 18 on the first body portion 12. When the pivot member 42, 42' is in its closed position, each channel wall 46 pivots toward the corresponding flange 66, thereby blocking portions of the channel to lock the trunnion 18 between the channel wall 46 and the flange 66 and prevent the trunnion 18 from sliding in the channel.

In order to lock the trunnions 18 in either of the lock positions and thereby to lock the two body portions together, biasing means is provided for urging the pivot member 42, 42' into its closed position. In the preferred embodiment, the biasing means comprises a torsion spring 82. The spring 82 has two coils, the outer extensions of which are secured at the base of the sidewalls 64 near the mounting plate 68 and the inner extensions of which form a closed loop and are urged against the pivot member 42, 42' at the inner edge of the bottom wall of the lever 44, 44'. The lever 44, 44' provides release means for disengaging the locking action of the spring 82. When the lever 44, 44' is depressed against the action of the spring 82, the pivot member 42, 42' moves into its open position to allow the trunnions 18 to slide in their channels. When the pressure on the lever 44, 44' is removed, the biasing action of the spring 82 automatically returns the pivot member 42, 42' to its closed position.

In order to illustrate the installation of a fastener constructed according to the invention, the installation of the preferred embodiment of the fastener 2 shown in the drawings in an aircraft will be described. The first step is to attach the first body portion 12 to the lower surface of the ceiling panel 4 near the outer edge of the ceiling panel 4. This is accomplished by drilling two suitable holes in the ceiling panel 4, placing a screw through each hole 28 in the mounting plate 26 and the corresponding drilled hole in the ceiling panel 4, and tightening each screw by means of a nut and washer to secure the first body portion 12 to the ceiling panel 4. A similar procedure is followed to connect the second body portion to the top wall of the storage bin 6. However, there is more flexibility in attaching the second body portion. The slots 70 in the mounting plate 68 automatically correct for minor misalignments of the drilled holes in the top of the storage bin 6 since, until the attachment is tightened, the screws will slide longitudinally within the slots 70.

Figure 11:
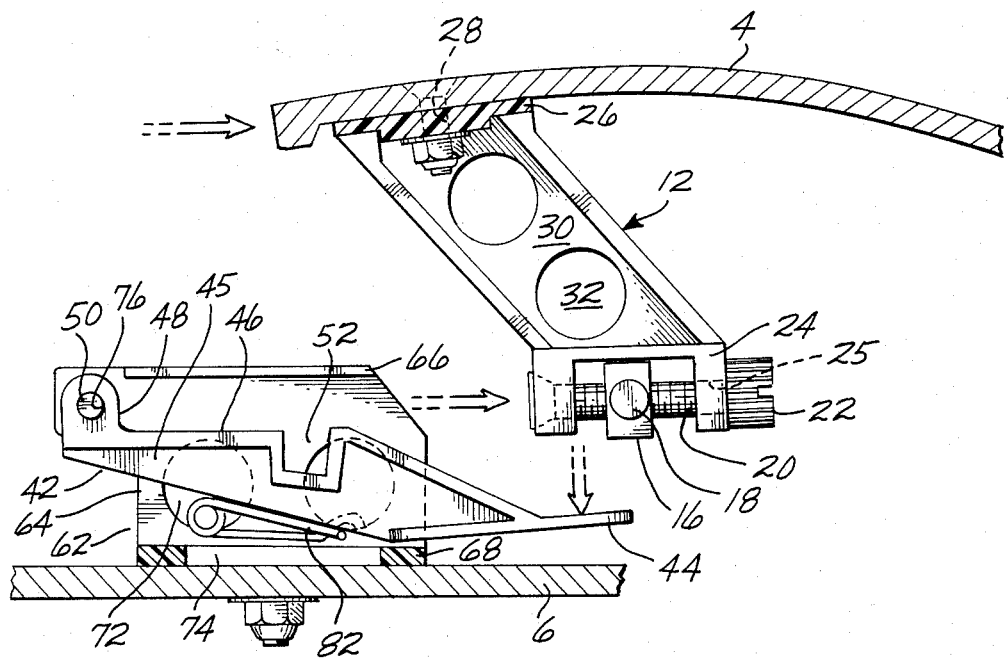
FIG. 11 is similar to FIG. 4 except that it illustrates the two body portions of the fastener being disengaged to disconnect the ceiling panel from the storage bin to accomplish removal of the ceiling panel.

Once the two body portions are firmly attached to their corresponding structural members, the first body portion 12 is brought into proximity with the second body portion, reversing the line of motion shown by the arrow in FIG. 11. At this point, the ceiling panel 4 is in the lowered position shown by broken lines in FIGS. 2 and 3. With the two body portions close together, the lever 44, 44' is depressed to allow the two channels to receive the trunnions 18. The trunnions 18 are slid into the channels past the first lock position and all the way to the second lock position at the inner end of the channels. In this position, the trunnions 18 are prevented from sliding out of the inner end of the channels by end walls 48 of the channel walls 46. These end walls 48 curve upwardly from the main channel walls 46 to block the inner ends of the channels regardless of the position of the pivot member 42, 42'.

When the trunnions 18 have slid to the inner end of the channels, the lever 44, 44' is released to lock the trunnions 18 in their second lock position in the channels. In this second lock position, the trunnions 18 are prevented from sliding in the channels by the abutment of the flanges 66, the endwalls 48, and the inner portions of the main channel walls 46 which, when the pivot member 42, 42' is in its closed position, taper upwardly toward the lower surfaces of the flanges 66. The second lock position is illustrated in FIG. 6.

With the trunnions 18 held in the second lock position, the ceiling panel 4 is securely connected to the storage bin 6. At this point, the ceiling panel 4 and the fastener 2 are in the positions illustrated in broken lines in FIGS. 2 and 3 and in solid lines in FIG. 10. Preferably, when the ceiling panel 4 is in this lower position, a wire support or lanyard 11, such as that shown in FIG. 3, extends downwardly from a central support structure in the aircraft to the inner edge of the ceiling panel 4 to prevent the ceiling panel 4 from rotating downwardly more than a predetermined amount.

To place the ceiling panel 4 in its use position, the panel 4 need only be rotated upwardly until its inner edge is aligned with one of the C-shaped supports 10 provided along the axial center line of the aircraft. With the panel 4 so aligned, the lever 44, 44' is depressed to allow the trunnions 18 to slide from their second lock position to their first lock position and then the lever 44, 44' is released to lock the trunnions 18 into this first lock position. As the first body portion 12 moves horizontally to allow the trunnions 18 to slide into their first lock position, the inner edge of the ceiling panel 4 slides into the C-shaped support 10. The panel 4 is now fully installed in its use position. The use position is illustrated in solid lines in FIGS. 2 and 3, and the first lock position of the trunnions 18 is most clearly shown in FIGS. 4 and 5.

Referring to FIG. 4, it is clear that in the second lock position each trunnion 18 is disposed in a substantially U-shaped recess 52 in the corresponding channel wall 46 and sidewall 45. When the trunnions 18 are disposed in the recesses 52 and the pivot member 42, 42' is in its closed position, the trunnions 18 are prevented from sliding in the channels by the walls of the recesses 52 and the proximity of the channel walls 46 to the flanges 66. In this position, the outer edge of each channel wall 46 contacts the lower surface of the corresponding flange 66 to close the outer end of the channel. Thus, the trunnions 18 cannot slide out of the outer end of the channels unless the lever 44, 44' is depressed to move the pivot member 42, 42' into its open position and thereby open the outer end of each channel.

Figure 10:
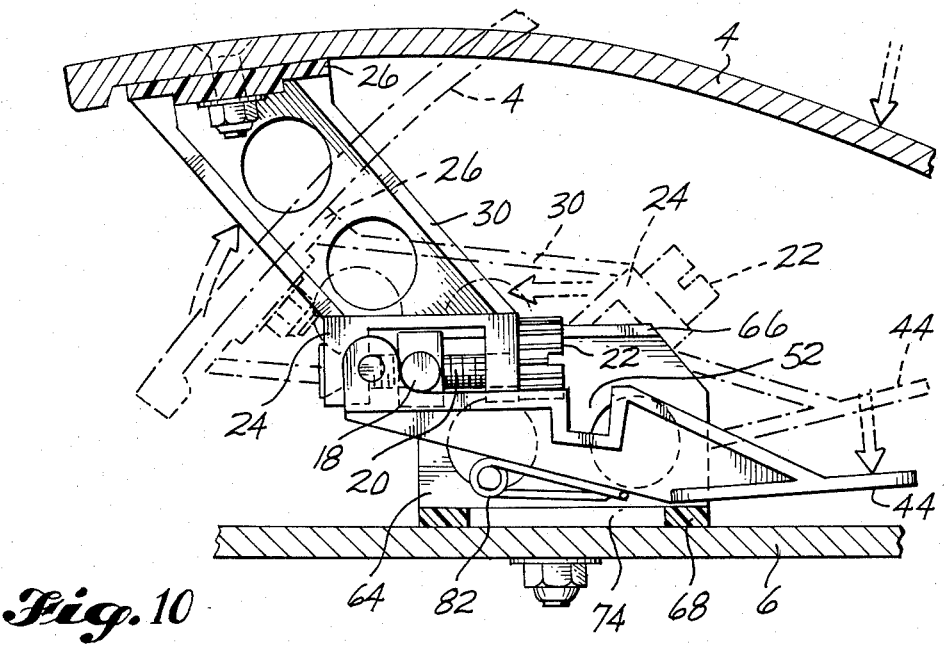
FIG. 10 shows in broken lines the preferred embodiment of the fastener positioned as shown in FIG. 4, and in solid lines the positioning of the fastener and the outer portion of the ceiling panel when the ceiling panel has been lowered to provide access to the space above it, with arrows included to indicate the sequence of movements from the broken line position to the solid line position.

Once the ceiling panel 4 has been installed, it may be desirable to gain access to the space above the panel 4 without entirely removing the panel 4 and without releasing the connection between the panel 4 and the storage bin 6. This is easily accomplished by reversing the installation process just described until the panel 4 is in the lowered position illustrated in broken lines in FIGS. 2 and 3. The movements of the fastener 2 and the inner portion of the panel 4 when the panel 4 is shifted from its use position to its lowered position are illustrated in FIG. 10. With the panel 4 in the lowered position, the maintenance in the space above the use position of the panel 4 may be carried out. After the maintenance has been completed, the panel 4 may easily be restored to its use position as described above.

The installation and maintenance procedures just described necessarily require that the ceiling panel 4 be able to both rotate and translate in a substantially horizontal direction with respect to the storage bin 6 while remaining connected to the bin 6. It is anticipated that in most applications of the fastener of this invention it will similarily be desirable to allow the two structural members being connected by the fastener to rotate with respect to each other. However, some applications may either not require such rotation or actually require non-rotation. In such a case, the journal means 14 of the first body portion 12 may easily be prevented from rotating in the corresponding channel means by any of a variety of conventional means. By way of example only, square trunnions or trunnions with squared edges might be provided to prevent rotation.

An important feature of the fastener 2 of the preferred embodiment is that the translational positions of the first and second body portions with respect to each other may be adjusted. This might be necessary, for example, to correct for variations in the width of the ceiling panels or in the width of the aircraft and the consequent lack of optimum meshing of the inner edge of a panel 4 with the C-shaped support 10. One means of making such adjustments has already been described in connection with the mounting of the second body portion onto the top of the storage bin 6. In order to slide the second body portion inwardly or outwardly, and thereby slide the ceiling panel either inwardly or outwardly, one need only loosen the screws attaching the mounting plate 68, slide the base member 62 in the desired direction, and then retighten the screws.

Figure 7:
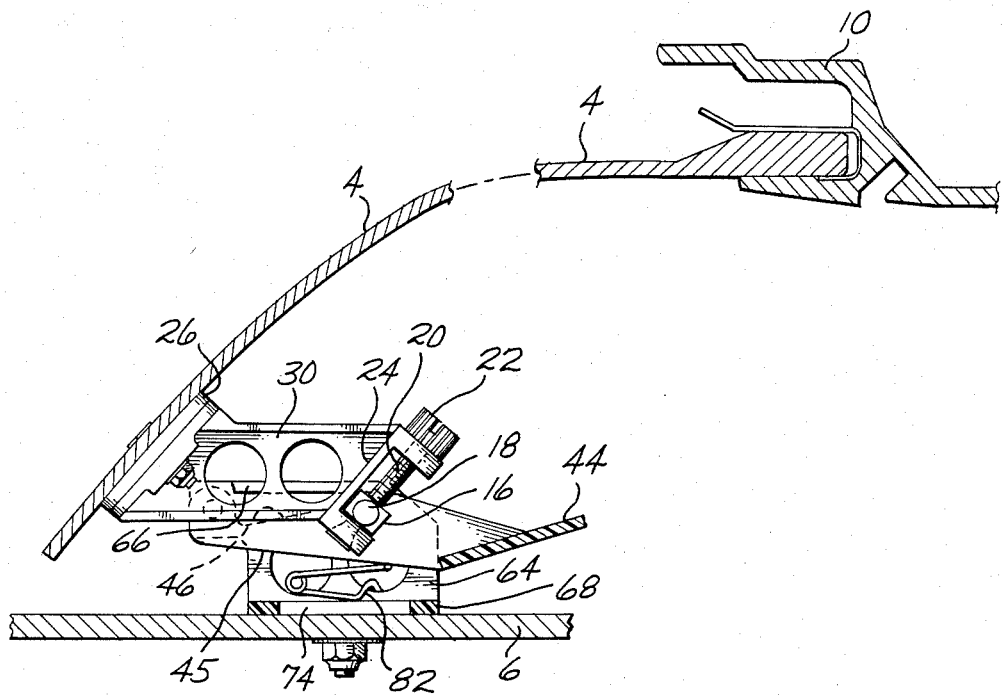
FIG. 7 is similar to FIG. 4 except that an inner portion of the ceiling panel and the C-shaped support in the center of the aircraft have been added and foreground portions of the fastener have been cut away to illustrate the use of the screw and nut adjustment to move the ceiling panel in its inward-most position.
Figure 8:
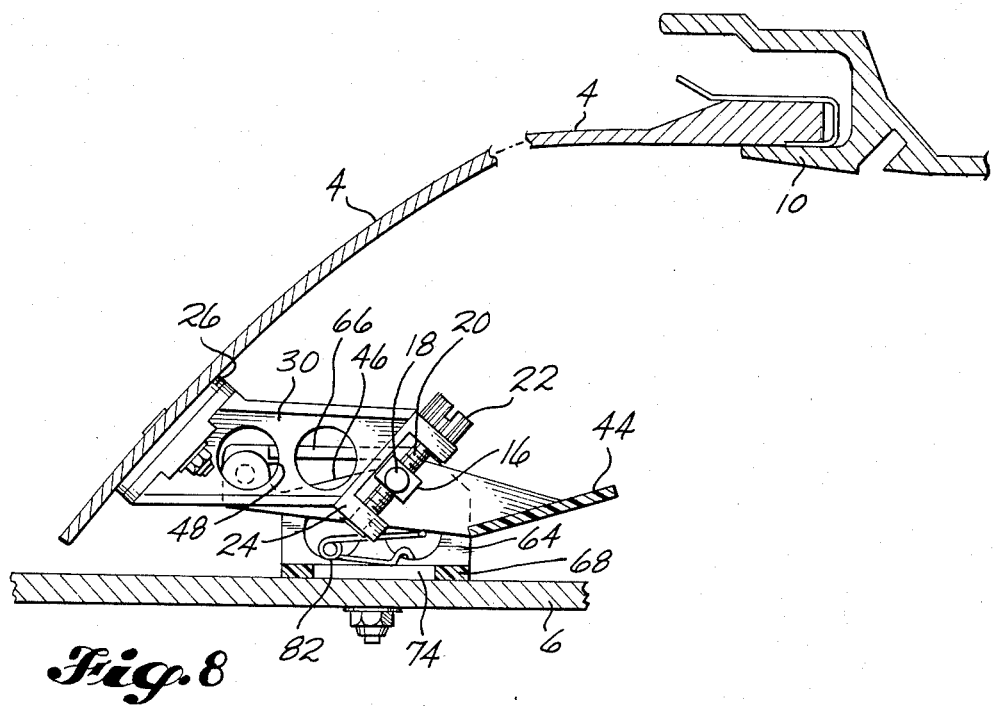
FIG. 8 is similar to FIG. 7 except that the ceiling panel is shown adjusted to an intermediate position.
Figure 9:
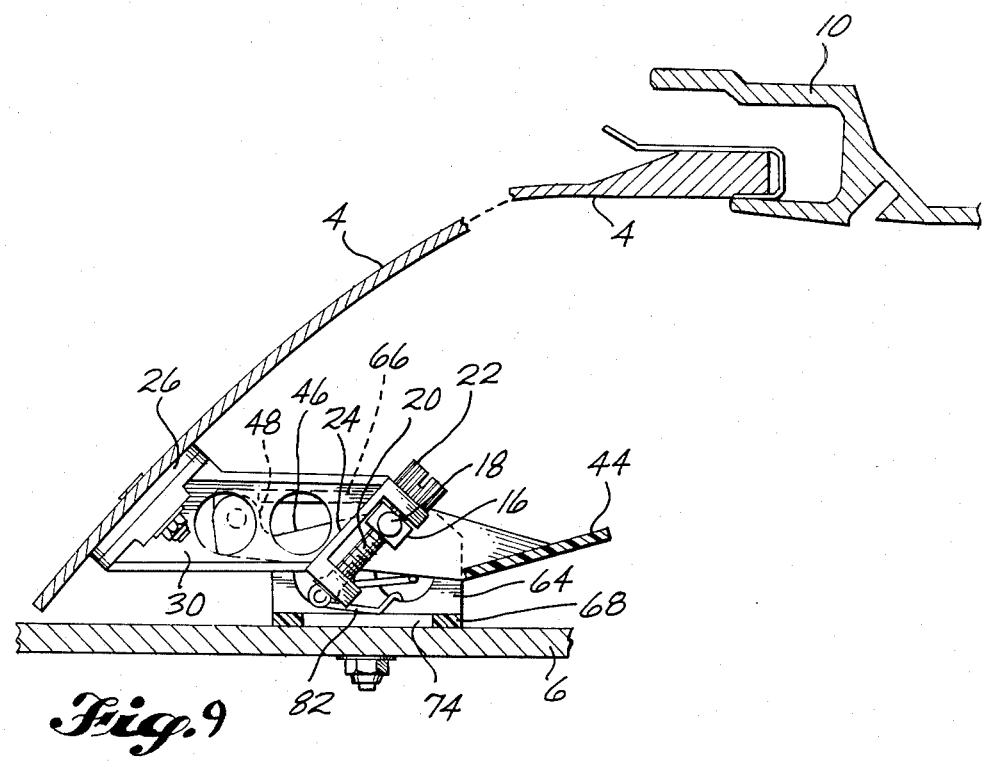
FIG. 9 is similar to FIG. 7 except that the ceiling panel is shown adjusted to an outward-most position.

The fastener 2 is preferably provided with additional means for making adjustments in the positioning of the ceiling panel 4. The preferred means for adjusting the positioning is to move the trunnions 18 with respect to the rest of the first body portion 12 while the trunnions 18 remain in one of the lock positions. Referring to FIGS. 7-9, the inner end of the first body portion 12 is provided with a yoke 24 oriented parallel to the mounting plate 26 attached to the outer end of the first body portion 12. The yoke 24 has two ends that extend inwardly in a direction that is perpendicular to the mounting plate 26. A hole 25 extends through each end of the yoke 24, with the two holes being aligned in a direction parallel to the mounting plate 26. A screw 20 is received through the two holes 25 in the ends of the yoke 24, and a screw cap 22 is secured to the outer end of the screw 20 projecting outwardly out of the hole 25. The screw cap 22 is secured so that, when the cap 22 is rotated, the screw 20 also rotates.

The trunnions 18 are mounted on the outer edges of a nut-shaped member 16. The screw 20 extends respectively through the hole 25 in a first end of the yoke 24, the hole 17 in the nut-like member 16, the hole 25 in the other end of the yoke 24, and the screw cap 22. When the screw cap 22 is rotated, the screw 20 rotates and the nut member 16 moves axially along the screw 20. Since the trunnions 18 are rigidly attached to the nut member 16, the trunnions 18 also move axially along the screw 20 when the screw cap 22 is rotated. The nut member 16 and the trunnions 18 are prevented from rotating with the screw 20 by the abutment of one of the edges of the nut member 16 against the inner top surface of the yoke 24.

The screw 20 rotates in an essentially fixed position, but the trunnions 18 move longitudinally in a direction parallel to the mounting plate 26, and therefore parallel to the portion of the surface of the ceiling panel 4 to which the mounting plate 26 is attached. Since the mounting plate 26 is rigidly attached to the outer end of the first body portion 12 and since the angular orientation of the first body portion 12 described above accommodates the downward slope of the outer edge of the panel 4, the ceiling panel 4 moves inwardly or outwardly as desired when the screw 20 is rotated to accomplish the adjustment of the positioning of the panel 4. FIG. 7 illustrates the inward-most adjustment of the position of the ceiling panel 4, FIG. 8 illustrates an intermediate adjustment, and FIG. 9 illustrates the outward-most adjustment. With these adjustments, variations in the width of the ceiling panel 4 and/or of the aircraft may easily be accommodated and the ceiling panel 4 installed to mesh properly with the C-shaped support 10.

As discussed above, one of the advantages of the fastener of this invention is that it may be made to be very lightweight to provide weight savings and, therefore, fuel cost savings when a number of the fasteners are used in an aircraft. The fastener of the invention is lightweight because its construction requires a relatively small amount of material and is compatible with the use of strong lightweight materials. By way of example only, the fastener might be constructed from flame retardant nylon that is 30 percent glass filled. Such material has the advantages of being very strong and lightweight and also of meeting fire safety standards applicable to aircraft.

Throughout the description of the structure and operation of the preferred embodiment of the fastener of this invention, the terms "upper", "lower", and the like have been used. These terms have been used for illustrative purposes only, illustrating a typical use attitude of the fastener. The terms are not intended to indicate that the use attitude of the fastener of the invention is limited to a horizontal position, and it is intended to be understood that the fastener of this invention can be used to an advantage in other use attitudes. For example, the fastener might be used to releasably and adjustably connect two structural members that are oriented vertically rather than horizontally.

It will be obvious to those skilled in the art to which this invention is addressed that the invention may be used to advantage in a variety of situations. Therefore, it is also to be understood by those skilled in the art that various changes, modifications, and omissions in form and detail may be made with departing from the spirit and scope of the present invention as defined by the following claims.

I claim:

1. A fastener for releasably and adjustably connecting two structural members, comprising:
a first body portion including journal means;
a second body portion including channel means for slidably receiving the journal means;
disengageable lock means for locking the journal means in the channel means in any one of at least two lock positions that are spaced apart along the channel means, to prevent the journal means from sliding within and along the channel means and to lock the first and second body portions together;
release means for disengaging the lock means to permit the journal means to slide within and along the channel means from one lock position to another and the first and second body portions to move translationally with respect to each other, and to permit said body portions to be disconnected from each other;
adjusting means for adjusting the translational positions of said body portions with respect to each other while the journal means remains in one of said lock positions;
means for attaching the first body portion to one of the structural members; and
means for attaching the second body portion to the other of the structural members;
wherein the release means, when used to permit movement between said lock positions, and the adjusting means serve to allow the two structural members to be moved translationally with respect to each other without disconnecting said structural members from each other.

2. A fastener as described in claim 1, in which the adjusting means includes moving means for moving the journal means with respect to a portion of the first body portion.

3. A fastener as described in claim 2, in which the moving means comprises a nut member to which the journal means is rigidly attached, and a screw member which is rotatable in an essentially fixed position and along which the nut member moves longitudinally when the screw member is rotated.

4. A fastener as described in claim 2 or claim 3, in which the first body portion is attachable to a substantially planar surface; and the moving means moves the journal means in a direction that is substantially parallel to said planar surface.

5. A fastener as described in claim 2 or claim 3, in which the means for attaching the first body portion comprises a mounting plate rigidly attached to one end of the first body portion; and the moving means is positioned at the other end of the first body portion and moves the journal means with respect to and in a direction that is essentially parallel to the mounting plate.

6. A fastener as described in claim 1, claim 2, or claim 3, in which the journal means comprises two coaxial trunnions; and the channel means is defined by portions of the second body portion that cooperate to define two channels, each of said channels slidably receiving one of the trunnions.

7. A fastener as described in claim 1, in which the lock means rotatably locks the journal means in each of said lock positions.

8. A fastener for releasably and adjustably connecting two structural members, comprising:
a first body portion including journal means;
a second body portion including channel means for slidably receiving the journal means; said second body portion comprising a base member, and a pivot member; and said pivot member having at least two positions including an open position in which portions of the base member and portions of the pivot member cooperate to define the channel means for slidably receiving the journal means, and a closed position in which the pivot member blocks portions of the channel means to prevent the journal means for sliding in the channel means;

disengageable lock means for locking the journal means in the channel means in any one of at least two lock positions to prevent the journal means from sliding in the channel means and to lock the first and second body portions together;

release means for disengaging the lock means to permit the journal means to slide from one lock position to another and the first and second body portions to move translationally with respect to each other and to permit said body portions to be disconnected from each other;

adjusting means for adjusting the translational positions of said body portions with respect to each other while the journal means remains in one of said lock positions;

means for attaching the first body portion to one of the structural members; and means for attaching the second body portion to the other of the structural members;

wherein the release means, when used to permit movement between said lock positions, and the adjusting means serve to allow the two structural members to be moved translationally with respect to each other without disconnecting said structural members from each other.

9. A fastener as described in claim 8, in which the lock means comprises biasing means for urging the pivot member into said closed position.

10. A fastener as described in claim 9, in which the release means comprises a lever formed as an integral extension of the pivot member, said lever when depressed moving the pivot member against the force of the biasing means toward its open position.

11. A fastener as described in claim 8, in which the adjusting means includes moving means for moving the journal means with respect to a portion of the first body portion.

12. A fastener as described in claim 11, in which the moving means comprises a nut member to which the journal means is rigidly attached, and a screw member which is rotatable in an essentially fixed position and along which the nut member moves longitudinally when the screw member is rotated.

13. A fastener as described in claim 8, claim 11, or claim 12, in which the journal means comprises two coaxial trunnions; the channel means comprises two channels, each of said channels slidably receiving one of the trunnions; and the pivot member blocks portions of each of said channels when it is in said closed position.

14. A fastener as described in claim 8, in which the channel means has first and second ends; said first end being blocked by the pivot member, whatever the position of the pivot member, to prevent the journal means from sliding out of said first end; and said second end being blocked by the pivot member when the pivot member is in said closed position, and open when the pivot member is in said open position to allow the journal means to slide out of the channel means to disengage said body portions from each other.

15. A fastener for releasably and adjustably connecting two structural members, comprising:

a first body portion including journal means carried at one end of said body portion; and first mounting means for attaching said body portion to one of the structural members, said mounting means being carried at the other end of said body portion;

a second body portion comprising a base member including second mounting means for attaching the second body portion to the other of the structural members, sidewall means extending outwardly from the second mounting means, and flange means extending essentially perpendicularly from an outer portion of the sidewall means; and a pivot member including channel wall means; said pivot member having an open position in which the channel wall means cooperates with the flange means to define channel means for slidably receiving the journal means, and a closed position in which the pivot member blocks portions of the channel means to prevent the journal means from sliding in the channel means and to lock the first and second body portions together;

biasing means for urging the pivot member into said closed position; and positioning means for allowing the two structural members to be moved translationally with respect to each other without disconnecting said structural members from each other.

16. A fastener as described in claim 15, wherein the positioning means comprises adjusting means for adjusting the translational positions of said body portions with respect to each other while the pivot member remains in said closed position to prevent the journal means for sliding in the channel means.

17. A fastener as described in claim 15, wherein the journal means has at least two lock positions in the channel means and is prevented from sliding out of any one of said lock positions by the pivot member when the pivot member is in said closed position; and the positioning means comprises release means for moving the pivot member against the force of the biasing means toward its open position to permit the journal means to slide from one lock position to another and the first and second body portions to move translationally with respect to each other.

18. A fastener as described in claim 17, wherein the positioning means further comprises adjusting means for adjusting the translational positions of said body portions with respect to each other while the pivot member remains in said closed position to prevent the journal means from sliding in the channel means.

19. A fastener as described in claim 16 or claim 18, wherein the adjusting means includes moving means for moving the journal means with respect to a portion of the first body portion.

20. A fastener as described in claim 19, wherein the moving means comprises a nut member to which the journal means is rigidly attached, and a screw member which is rotatable in an essentially fixed position and along which the nut member moves longitudinally when the screw member is rotated.

21. A fastener as described in claim 15, wherein the journal means comprises two coaxial trunnions; the channel means comprises two channels, each of said channels slidably receiving one of the trunnions; and the pivot member blocks portions of each of said channels when it is in said closed position.

22. A fastener as described in claim 21, wherein the sidewall means comprises two essentially parallel sidewalls; and the pivot member is positioned between said sidewalls.

23. A fastener as described in claim 22, further comprising a lever formed as an integral extension of the pivot member, said lever extending outwardly from between said sidewalls of the base member, and said lever when depressed moving the pivot member against the force of the biasing means toward said open position.

24. In a system in which a first structural member is supported generally above a second structural member, a fastener for releasably and adjustably connecting an end portion of the first structural member to the second structural member and for allowing the first structural member to rotate and translate in a substantially horizontal direction with respect to the second structural member while remaining connected to the second structural member, comprising:

a first body portion including journal means;

a second body portion including channel means for slidably receiving the journal means;

disenageable lock means for locking the journal means in the channel means in any one of at least two lock positions that are spaced apart along the channel means, to prevent the journal means from sliding within and along the channel means and to lock the first and second body portions together; said journal means being rotatable in the channel means in at least one of said lock positions;

release means for disengaging the lock means to permit the journal means to slide within and along the channel means from one lock position to another and the first and second body portions to move translationally with respect to each other, and to permit said body portions to be disconnected from each other;

means for attaching the first body portion to one of the structural members; and means for attaching the second body portion to the other of the structural members.

25. A fastener according to claim 24, further comprising adjusting means for adjusting the translational positions of said body portions with respect to each other while the journal means remains in one of said lock positions.

26. A fastener according to claim 25, in which the adjusting means includes moving means for moving the journal means with respect to a portion of the first body portion.

27. A fastener as described in claim 26, in which the moving means comprises a nut member to which the journal means is rigidly attached, and a screw member which is rotatable in an essentially fixed position and along which the nut member moves longitudinally when the screw member is rotated.

28. In a system in which a first structural member is supported generally above a second structural member, a fastener for releasably and adjustably connecting an end portion of the first structural member to the second structural member and for allowing the first structural member to rotate and translate in a substantially horizontal direction with respect to the second structural member while remaining connected to the second structural member, comprising:

a first body portion including journal means;

a second body portion including channel means for slidably receiving the journal means; said second body portion comprising a base member, and a pivot member; and said pivot member having at least two positions including an open position in which portions of the base member and portions of the pivot member cooperate to define the channel means for slidably receiving the journal means, and a closed position in which the pivot member blocks portions of the channel means to prevent the journal means from sliding in the channel means;

disengageable lock means for locking the journal means in the channel means in any one of at least two lock positions to prevent the journal means from sliding in the channel means and to lock the first and second body portions together;

release means for disengaging the lock means to permit the journal means to slide from one lock position to another and the first and second body portions to move translationally with respect to each other and to permit said body portions to be disconnected from each other;

means for attaching the first body portion to one of the structural members; and means for attaching the second body portion to the other of the structural members.

29. A fastener as described in claim 28, in which the lock means comprises biasing means for urging the pivot member into said closed position.

30. A fastener as described in claim 29, in which the release means comprises a lever formed as an integral extension of the pivot member, said lever when depressed moving the pivot member against the force of the biasing means toward said open position.

31. A fastener as described in claim 28, in which the channel means has first and second ends; said first end being blocked by the pivot member, whatever the position of the pivot member, to prevent the journal means from sliding out of said first end; and said second end being blocked by the pivot member when the pivot member is in said closed position, and open when the pivot member is in said open position to allow the journal means to slide out of the channel means to disengage said body portions from each other.

* * * * *

UNITED STATES PATENT AND TRADEMARK OFFICE
CERTIFICATE OF CORRECTION

PATENT NO. : 4,490,883

DATED : January 1, 1985

INVENTOR(S) : Richard F. Gauron

It is certified that error appears in the above-identified patent and that said Letters Patent is hereby corrected as shown below:

The sheets of drawings containing Figures 8-11 should be added to the drawings.

UNITED STATES PATENT AND TRADEMARK OFFICE
CERTIFICATE OF CORRECTION

PATENT NO. : 4,490,883          Page 2 of 6
DATED     : January 1, 1985
INVENTOR(S) : Richard F. Gauron It is certified that error appears in the above-identified patent and that said Letters Patent are hereby corrected as shown below:

Figs. 8-11 (sheets 6 and 7) should be added to the drawings, as follows:

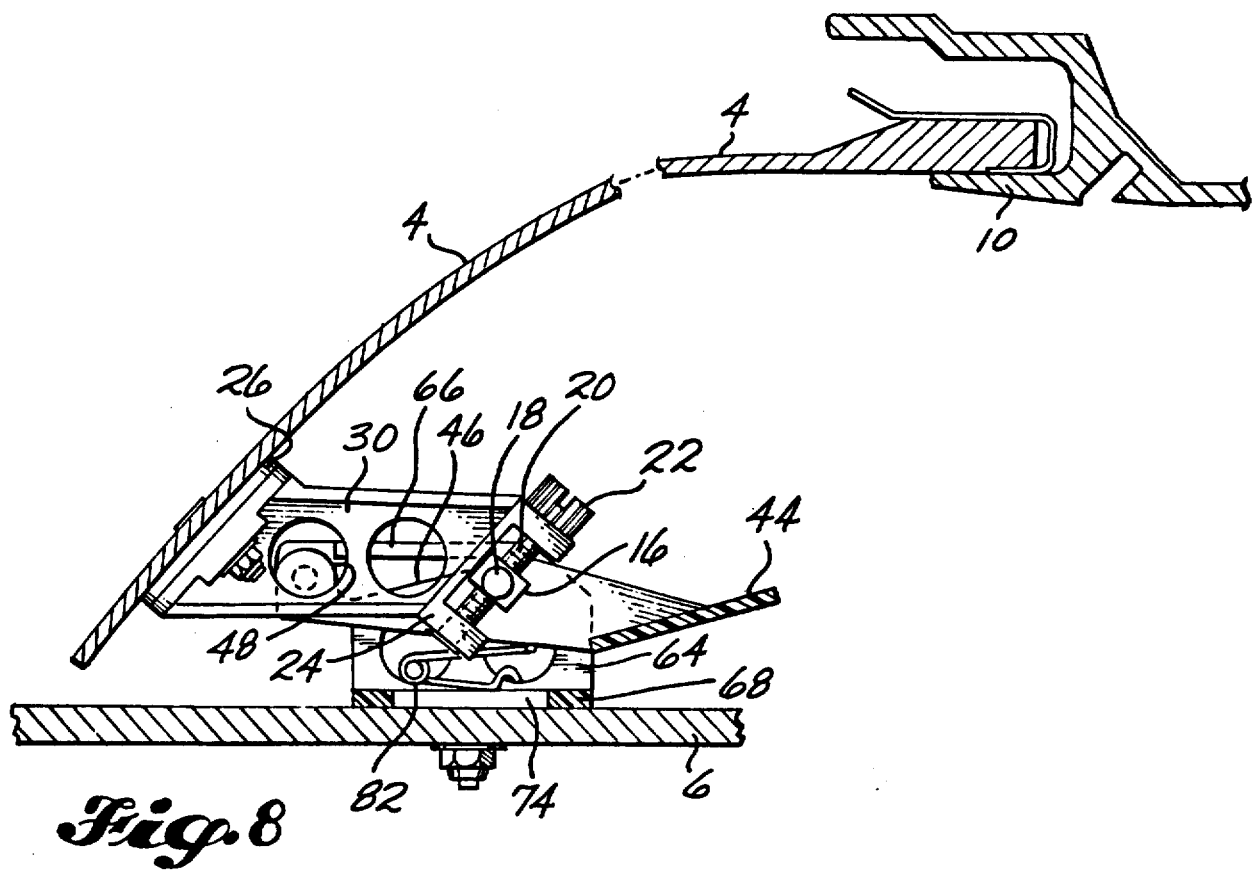

UNITED STATES PATENT AND TRADEMARK OFFICE
CERTIFICATE OF CORRECTION

PATENT NO. : 4,490,883
DATED : January 1, 1985
INVENTOR(S) : Richard F. Gauron

Page 3 of 6

It is certified that error appears in the above-identified patent and that said Letters Patent are hereby corrected as shown below:

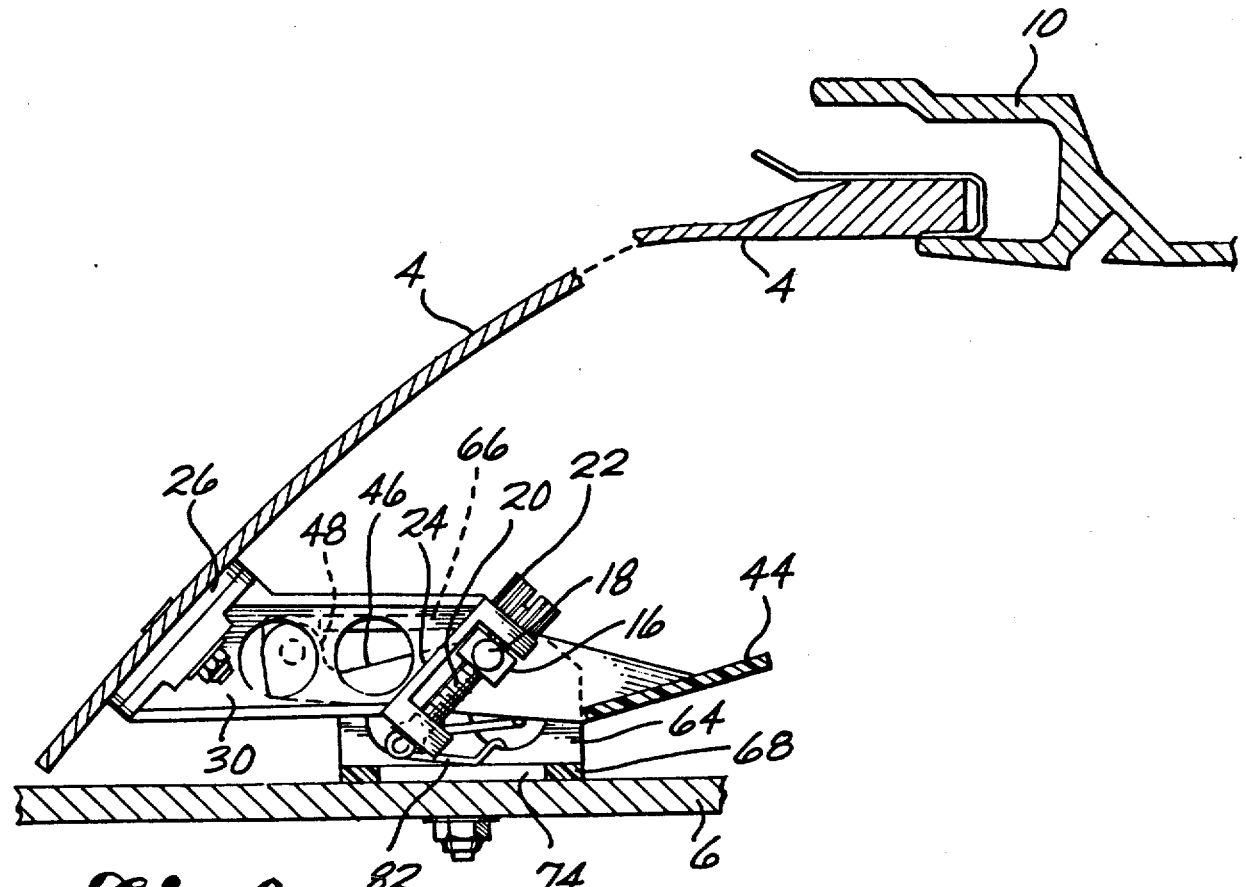

UNITED STATES PATENT AND TRADEMARK OFFICE
CERTIFICATE OF CORRECTION

PATENT NO. : 4,490,883

DATED : January 1, 1985

INVENTOR(S) : Richard F. Gauron

It is certified that error appears in the above-identified patent and that said Letters Patent are hereby corrected as shown below:

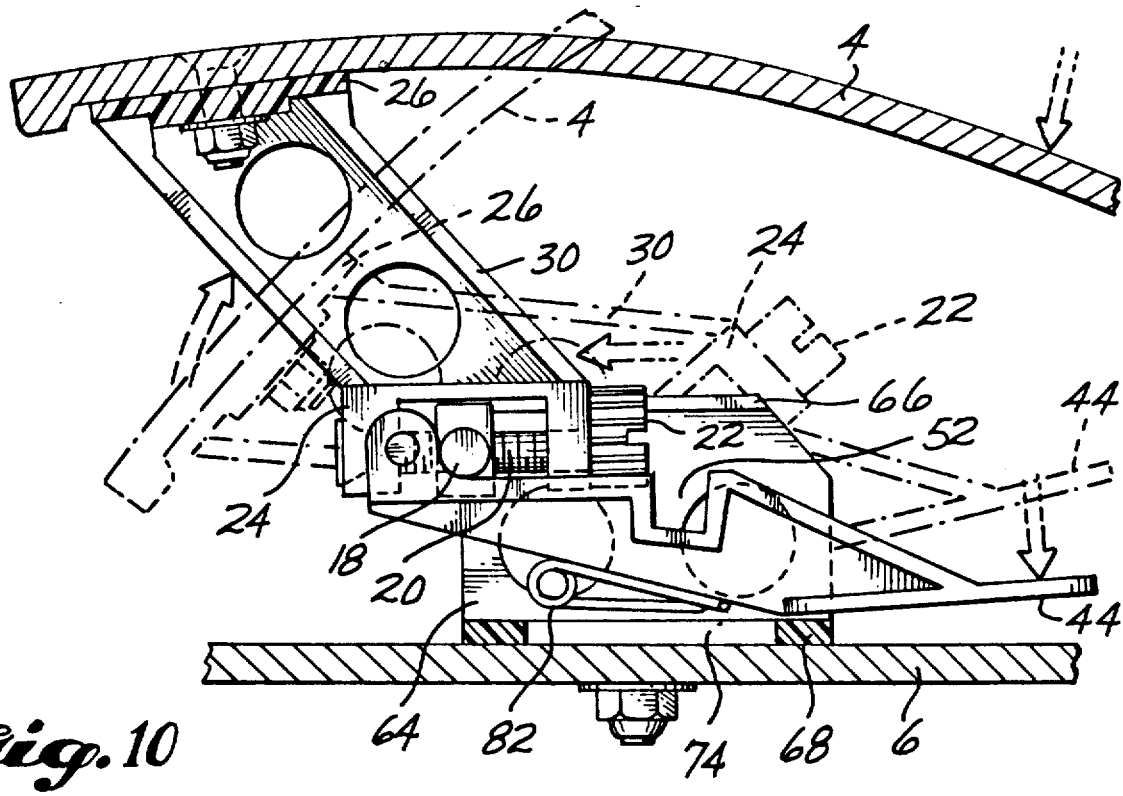

UNITED STATES PATENT AND TRADEMARK OFFICE
CERTIFICATE OF CORRECTION

PATENT NO. : 4,490,883
DATED : January 1, 1985
INVENTOR(S) : Richard F. Gauron

Page 5 of 6

It is certified that error appears in the above-identified patent and that said Letters Patent are hereby corrected as shown below:

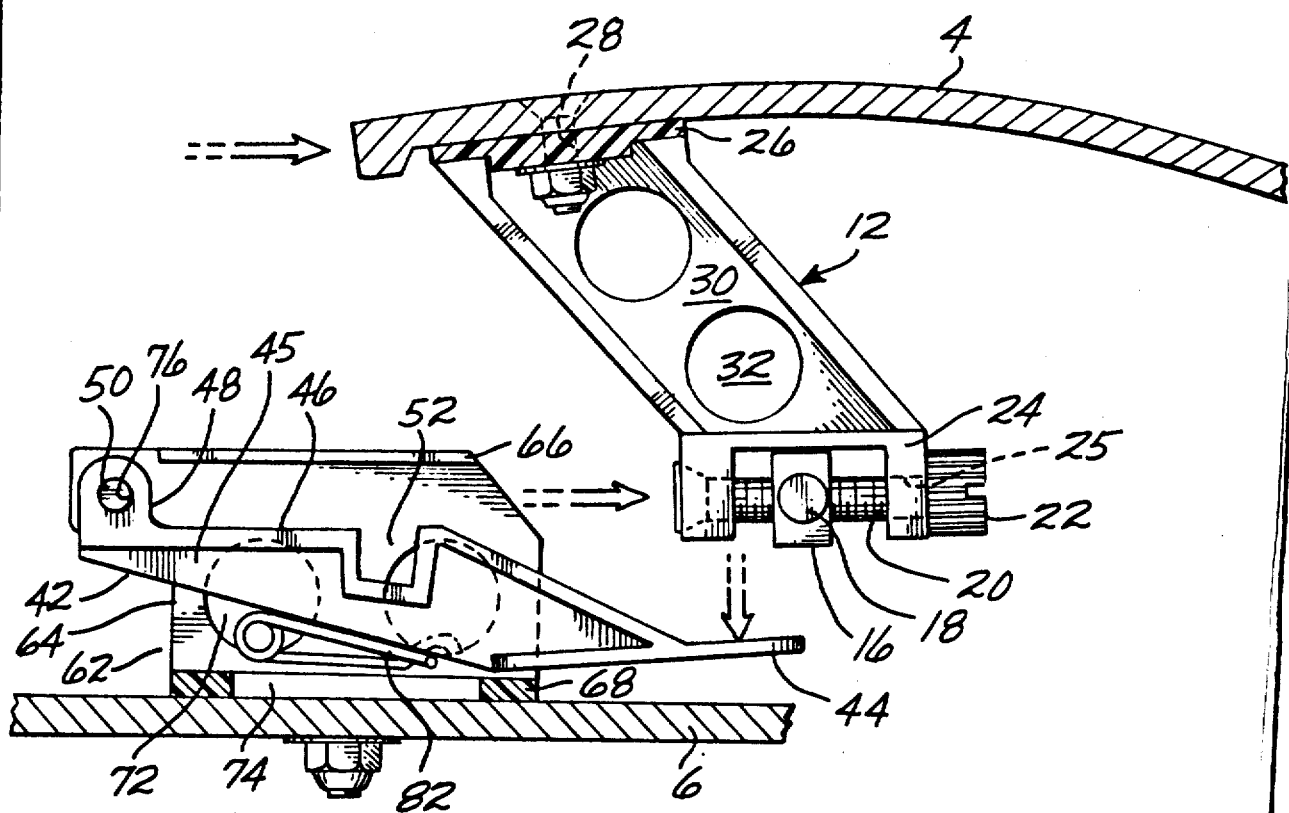

Fig. 11

UNITED STATES PATENT AND TRADEMARK OFFICE
CERTIFICATE OF CORRECTION

PATENT NO. : 4,490,883

DATED : January 1, 1985

INVENTOR(S) : Richard F. Gauron

It is certified that error appears in the above-identified patent and that said Letters Patent are hereby corrected as shown below:

Column 1, line 58, "1981" should be --1891--.

Column 7, line 29, "2" should be --42--.

Column 15, line 22, "disenageable" should be --disengageable--.

Signed and Sealed this

Fifth Day of November 1985

[SEAL]

Attest:

*Attesting Officer*

DONALD J. QUIGG

*Commissioner of Patents and Trademarks*